(12) United States Patent
Stoll et al.

(10) Patent No.: US 10,161,490 B2
(45) Date of Patent: Dec. 25, 2018

(54) CONTROL EQUIPMENT

(71) Applicant: FESTO AG & CO. KG, Esslingen (DE)

(72) Inventors: Kurt Stoll, Hohenkreuz (DE); Alfons Riek, Weilheim (DE); Martin Sigrist, Bern (CH); Elmar Mock, Columbier (CH); Samuel Malzach, Evilard (CH)

(73) Assignee: FESTO AG & CO. KG, Esslingen (DE)

( * ) Notice: Subject to any disclaimer, the term of this patent is extended or adjusted under 35 U.S.C. 154(b) by 23 days.

(21) Appl. No.: 15/129,933

(22) PCT Filed: Apr. 7, 2015

(86) PCT No.: PCT/EP2015/057507
§ 371 (c)(1),
(2) Date: Sep. 28, 2016

(87) PCT Pub. No.: WO2015/150574
PCT Pub. Date: Oct. 8, 2015

(65) Prior Publication Data
US 2017/0138446 A1    May 18, 2017

(30) Foreign Application Priority Data

Apr. 4, 2014    (EP) .................................... 14163640

(51) Int. Cl.
*F16K 31/04*        (2006.01)
*F16H 25/20*        (2006.01)
*H02K 7/06*         (2006.01)
*H02K 7/14*         (2006.01)
*H02K 37/24*        (2006.01)

(52) U.S. Cl.
CPC ........... *F16H 25/205* (2013.01); *F16H 25/20* (2013.01); *F16K 31/041* (2013.01);
(Continued)

(58) Field of Classification Search
CPC .... F16K 31/043; F16K 31/045; F16K 31/045; F16K 31/055; F16K 31/105; F16K 31/50;
(Continued)

(56) References Cited

U.S. PATENT DOCUMENTS 4,024,890 A * 5/1977 Yasuoka ................. F16K 1/221
137/556.3
4,241,897 A * 12/1980 Maezawa ................ F16K 1/221
251/229
(Continued)

FOREIGN PATENT DOCUMENTS

| BE | 829 166    | 9/1975 |
| DE | 2 107 530  | 6/1972 |
| EP | 2 345 817  | 7/2011 |
| JP | 61-1766    | 1/1986 |

*Primary Examiner* — Matthew W Jellet
(74) *Attorney, Agent, or Firm* — Rankin, Hill & Clark LLP

(57) ABSTRACT

Control equipment for generating a rotational travel motion from a rotational drive motion includes a drive shaft, an intermediate body, a reference body, and an output body that are movable relative to each other. The control equipment includes a first transmission and a second transmission, which is different from the first transmission. The first transmission transforms a rotational movement of the drive shaft relative to the reference body into a linear motion component of the intermediate body relative to the reference body, and the control equipment has a displacement line along which the intermediate body moves via the linear motion component of the intermediate body relative to the reference body. The second transmission transforms the linear motion component of the intermediate body into a rotational movement of the output body relative to the reference body.

21 Claims, 7 Drawing Sheets

(52) U.S. Cl.
CPC ............ *F16K 31/043* (2013.01); *H02K 7/06* (2013.01); *H02K 7/14* (2013.01); *H02K 37/24* (2013.01)

(58) Field of Classification Search
CPC .... F16K 31/502; F16K 31/506; F16K 31/508; F16K 31/2582; F16K 31/52458; F16K 31/52466; Y10T 74/18672; Y10T 74/1836; Y10T 74/18024; Y10T 137/6106; F16H 25/06; F16H 2025/2053
USPC ........ 251/129.11, 129.2, 252, 265, 268, 269, 251/270, 273, 304–317.01
See application file for complete search history.

(56) References Cited

U.S. PATENT DOCUMENTS

| | | | | |
|---|---|---|---|---|
| 4,504,038 A * | 3/1985 | King | ............ | F16K 1/221 137/75 |
| 4,960,003 A * | 10/1990 | Hartley | ............ | F16H 25/06 74/216.3 |
| 5,984,260 A * | 11/1999 | Rawson | ............ | F16K 31/047 251/129.12 |
| 6,561,480 B1 * | 5/2003 | Komiya | ............ | F16K 1/38 251/122 |
| 8,201,803 B2 * | 6/2012 | Hodnefjell | ............ | F16K 31/043 251/129.11 |
| 8,297,588 B2 * | 10/2012 | Ohuchi | ............ | F16K 31/047 251/129.12 |

* cited by examiner

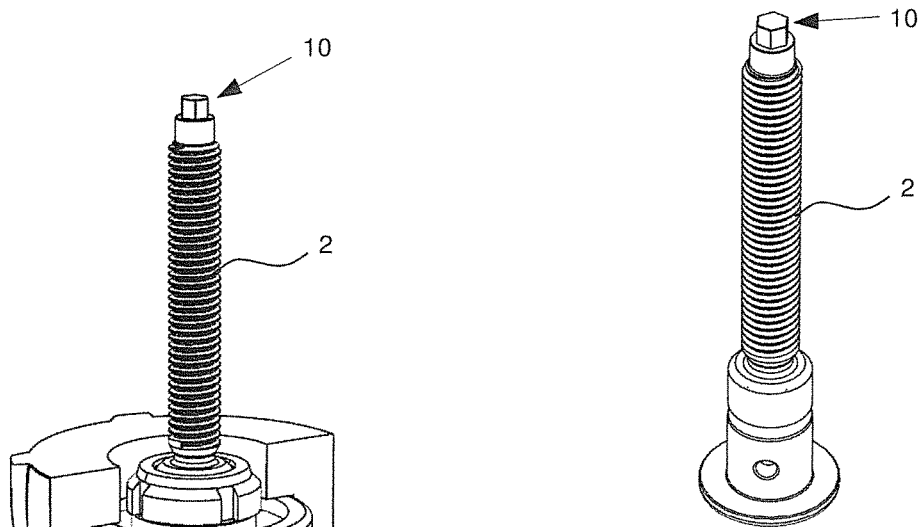
Fig. 9
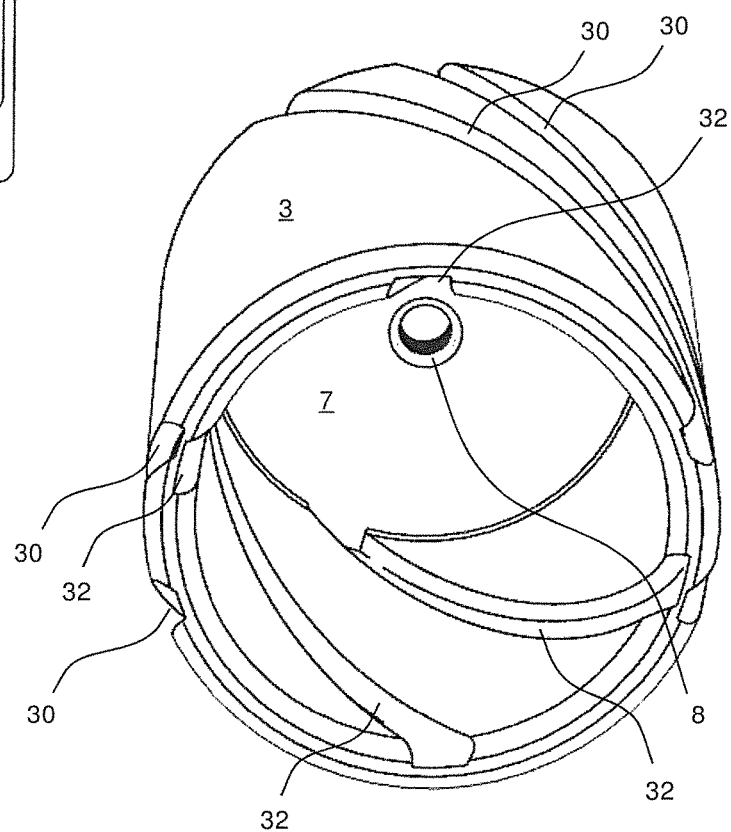
Fig. 7
Fig. 8

CONTROL EQUIPMENT

BACKGROUND OF THE INVENTION

Field of the Invention

The invention relates to the field of actuation devices for producing a rotational actuation movement from a rotational drive movement. In particular, the invention relates to the field of actuation devices for the rotational adjustment of a valve. A further aspect of the invention relates to the field of devices which include have a fail-safe mechanism and an actuation device.

Description of Related Art

A rotational actuation movement is typically a movement of a few revolutions or a fraction of a revolution. A rotational actuation movement therefore includes a pivoting movement (for example by 90 degrees or by 60 degrees) as well as a rotating movement.

In the current state of the art, an actuation device for rotational movements by a rotational drive movement is typically driven by way of the rotational drive movement being transmitted onto a drive output via gearwheel transmissions, chains and/or belts, by which means the drive output likewise carries out a rotational movement. Thereby, a gearing or transmission is formed between the rotational drive movement and the rotational movement of the drive output. This gearing or transmission ratio permits a relative small actuation movement to be achieved by a comparatively large drive movement. The application of expensive, high-torque and large drives for driving the actuation device can be avoided with known actuation devices on account of this.

The design of known actuation devices, however, is complicated and such devices turn out to be spatially quite large, on account of the hitherto existing construction manner, which realises a coupling of the rotational drive movement to the rotational movement of the drive output by way of gearwheel transmissions, chains and/or belts. Moreover, known actuation devices can include many individual parts and/or small, precisely manufactured parts and are expensive in manufacture, assembly, maintenance and repair. Moreover, known actuation devices can be quite prone to malfunctioning, can greatly wear and/or can be difficult to assemble, to service or to repair.

SUMMARY OF THE INVENTION

It is therefore the object of the invention, to provide an actuation device of the initially mentioned type, which at least partly overcomes at least one of the disadvantages mentioned above.

The actuation device according to the invention and for producing a rotational actuation movement from a rotational drive movement, in particular for the rotational adjustment of a valve, includes a drive shaft, an intermediate body, a reference body and a driven body. Thereby, the above-mentioned elements of the actuation device are designed in a manner movable relative to one another. The actuation device moreover includes a first transmission and a second transmission which is different from the first transmission. Thereby the first transmission is designed such that it converts a rotational movement of the drive shaft relative to the reference body into a linear movement component of the intermediate body relative to the reference body, the actuation device includes a displacement line, along which the intermediate body moves due to the linear movement component of the intermediate body relative to the reference body and the second transmission is designed such that it converts the linear movement component of the intermediate body relative to the reference body into a rotational movement of the driven body relative to the reference body.

The drive shaft can accommodate a rotational drive movement of a drive and by way of this have a rotational movement relative to the reference body. The reference body can, for example, be a casing, a mount or a frame. The reference body remains spatially at the same location, in particular during an actuation movement. The reference body in the case of an actuation device for valves, for example, is rigidly arranged with respect to the valve housing or is rigidly arranged with respect to conduits leading to the valve.

The first transmission converts the rotational movement of the drive shaft (relative to the reference body) into a linear movement component of the intermediate body (relative to the reference body). The intermediate body therefore moves with a linear movement component relative to the reference body on account of the rotational movement of the drive shaft and the coupling thereto by way of the first transmission. This movement of the intermediate body on account of its linear movement component is effected along the displacement line. The complete reference body is thus moved along the displacement line by way of the linear movement component.

The displacement line in other words can also be the indicated as a straight displacement axis. The displacement line corresponds to the displacement axis, along which the linear movement component of the intermediate body runs.

The second transmission converts the linear movement component of the intermediate body (relative to the reference body) into a rotational movement of the driven body (relative to the reference body). The driven body thus rotates on account of the linear movement component of the intermediate body and its coupling onto the intermediate body by way of the second transmission. The first as well as the second transmission thereby transmit a movement or a force of the drive shaft onto the driven body.

The described actuation device, by way of the first transmission thus converts the rotational movement of the drive shaft into the linear movement component of the intermediate body and this, in turn, by way of the second transmission, into the rotational movement of the driven body. This linear movement component can also be indicated as a translation (linear travel).

In particular, not only can the intermediate body have a linear movement component relative to the reference body, but additionally yet also a rotational movement component. Expressed differently, the intermediate body can also execute a combined rotation-translation movement relative to the reference body.

A displacement of fluid (in particular of air in the reference body), which results from the translation movement or from the rotation-translation movement, can optionally be utilised, for example for pneumatic interactions or as a cooling for a drive. Switches can be triggered and/or activated, and/or valves and in particular one-way valves set, by way of pneumatic interactions.

The above-mentioned actuation device opens up new and advantageous possibilities concerning the spatial arrangement of moved parts on account of the conversion of the rotational movement into a linear movement component (and back again into a rotational movement). These new spatial arrangements of moved parts permit compact outer dimensions, with the same or an even improved stability of the actuation device. Such an actuation device can be designed from few individual parts. The actuation device can be designed from simply designed individual parts. The individual parts of the actuation device can be manufactured with a relatively large manufacturing tolerance. The described actuation device can be inexpensively manufactured and is simple to assemble, to repair and to service, for the previously mentioned reasons. A transmission from the drive shaft onto the driven body can be designed in a simple and space-saving manner by way of this actuation device.

The actuation device can include an indicator (display) mechanism, which permits an indication of the actuation position of the actuation device and which is mechanically, hydraulically and/or pneumatically coupled to the rotational movement and/or the linear movement component of parts of the actuation device.

The actuation position of the actuation device is to be understood as its operational condition, thus for example a position of the driven body and in particular its actuation angle. A simple, robust and reliable indication or display of the actuation position can be formed by way of coupling the indicator mechanism to the parts of the actuation device and its movements. The actuation position of the actuation device thus for example can indicate a position of a valve, for example in the case of a rotationally fixed coupling of the driven body onto the valve.

In an embodiment, the second transmission can surround the first transmission in a projection in the direction of a rotation axis of the rotational movement of the driven body.

A space-saving arrangement of the adjustment device can be achieved by way of a first transmission, which is surrounded by a second transmission in this projection.

As an optional feature, the second transmission can include a transmission of the first type. The transmission of the first type converts the linear movement component of the intermediate body relative to the reference body into a rotational movement of the intermediate body relative to the reference body.

In other words, the transmission of the first type (which is encompassed by the second transmission) couples the intermediate body to the reference body in a manner such that the linear movement component of the intermediate body (relative to the reference body) brings the intermediate body into a rotational movement (relative to the reference body).

Expressed differently, the transmission of the first type can also be called a reference body thread, since the transmission of the first type brings a rotational movement of the reference body and intermediate body into interaction with a linear movement component of the intermediate body relative to the reference body.

The intermediate body is thus coupled to the reference body by way of this transmission of the first type. The rotational movement of the intermediate body, which results from the linear movement component of the intermediate body, in particular, can contribute to the rotational movement of the driven body relative to the reference body.

As a further optional feature, the second transmission can include a transmission of a second type. The transmission of the second type converts a linear movement component of the intermediate body relative to the driven body into a rotational movement of the intermediate body relative to the driven body.

In other words, the transmission of the second type (which is encompassed by the second transmission) couples the intermediate body onto the driven body in a manner such that the linear movement component of the intermediate body (relative to the driven body) brings the intermediate body into a rotational movement (relative to the driven body).

Expressed differently, the transmission of the second type can also be called a driven body thread, since the transmission of the second type brings a rotational movement of the driven body and intermediate body into interaction with a linear movement component of the intermediate body relative to the driven body.

The intermediate body is therefore coupled to the driven body by way of this transmission of the second type. The rotational movement of the intermediate body, which results from the linear movement component of the intermediate body, in particular, can contribute to the rotational movement of the driven body relative to the reference body.

In particular, the second transmission can include a transmission of the first type as well as a transmission of the second type. A transmission of the movement and the force by the second transmission can be divided onto at least two part-transmissions (specifically a transmission of the first type and a transmission of the second type) by way of this. The fact that the second transmission includes a transmission of the first type as well as a transmission of the second type is advantageous with regard to the wearing, dimensioning, running smoothness, assembly friendliness, repair friendliness and/or maintenance friendliness of the actuation device. This is also advantageous for the efficiency of the actuation device.

A drive axis can alternatively or additionally be arranged parallel to a drive output axis. In particular, the drive axis can be arranged coaxially to the drive output axis. Thereby, the drive shaft rotates about the drive axis with the rotational movement, and the driven body rotates about the drive output axis with the rotational movement.

A parallel arrangement of the drive axis and the drive output axis permits a compact arrangement of the drive shaft and the driven body. A coaxial arrangement also permits a compact arrangement. Moreover, a coaxial arrangement permits a self-centering design of a functional unit including the drive shaft and the driven body.

The displacement line can be arranged parallel to the drive output axis as another optional feature.

Expressed differently, the linear movement component then moves the intermediate body parallel to the drive output axis. This permits an advantageous arrangement of the moved parts of the actuation device and, by way of this, a compact design of the actuation device.

Additionally or alternatively, the first and/or the second transmission can include a helical transmission, which is arranged for the conversion of the rotational movements or the linear movement component.

A helical transmission includes a first component with a helicoidal guide designed in a spiral-like manner and can also be described as being helical or as a thread. The helical transmission moreover includes a second component with a counter-element to the helicoidal guide of the first component, by which means the second component is movable relative to the first component along the helical guide of this. On rotation of the first component relative to the second component (or also vice versa), the two components are moved relative to one another with a linear movement component along a middle axis of the helicoidal guide on account of the helical transmission. This additionally or alternatively applies to the helical transmission: the two components are rotated relative to one another by the helical transmission on moving the first component relative to the second component (or also vice versa) with a linear movement component along a middle axis of the helicoidal guide.

A functional selection can result for mechanical reasons, depending on a thread pitch of the helical transmission: the helical transmission, for example, can only convert the linear movement component into the rotational movement, but not the rotational movement into the linear component. Or, however, the helical transmission, for instance, can convert the rotational moment into the linear component, but not the linear movement component into the rotational movement.

It is also possible for no functional selection to be present. This means that the linear movement component is converted into the rotational movement, but the rotational movement can also be converted into the linear component.

This functional selection of the helical transmission depending on the thread pitch can be advantageously applied with the second transmission for example. The driven body although being able to be moved by a movement of the drive shaft, however, in the reverse functional direction, a movement of the driven body moving the drive shaft is simultaneously prevented.

In particular, the second transmission can be dimensioned in a spatially large manner in the actuation device described above. This can be utilised, in order to form large contact surfaces of the helical transmission. Large contact surfaces with helical transmissions reduce a pressure of a surface pressing, which given the same stability permits the use of softer material than with a surface pressing with a greater pressure. This can be advantageous with a material selection, since one can select the material from a larger number of materials by way of this. This in particular can result in more favourable manufacturing costs.

A helicoidal guide and/or a counter-element of the helicoidal guide can extend in the axial direction over a complete turn (thus a rotation about 360 degrees), over several turns or however only over fractions of a turn. In particular, a helicoidal guide and/or a counter-element of the helicoidal guide can extend over half a turn (180 degrees), over a third of a turn (120 degrees), over a quarter of a turn (90 degrees), over a sixth of a turn (60 degrees), over an eighth of a turn (45 degrees) or over a twelfth of a turn (30 degrees).

A helical transmission can be simply and inexpensively manufactured. A helical transmission is robust and can be designed such that it is low wearing. A helical transmission can be designed with few individual parts.

Optionally, the drive shaft can be mounted on the reference body in a translatorily fixed, but rotatable manner. In particular, the driven body can also be mounted on the reference body in a translatorily fixed, but rotatable manner.

What is meant by a translatorily fixed mounting of two bodies is that a mutual translation of the two bodies is not possible, which is to say that a linear movement of the two bodies relative to one another is not possible. Bodies that are mounted in a rotatable manner to one another can execute rotational movements relative to one another.

As a further optional feature, the actuation device includes an electrical drive. The drive is thereby arranged for driving the drive shaft.

What is meant by an electrical drive is an electro-drive, thus a converter from electrical into mechanical energy (electromechanical converter). In particular DC motors, AC motors and three-phase AC motors or stepper motors can be applied as an electrical drive.

The actuation device can be designed in a simple and compact manner by way of an electrical drive, which is encompassed by the actuation device. An actuation device can be operated in a reliable manner and as a unit that is autonomous with regard to drive technology. Actuation devices with an electrical drive can be simply controlled and/or regulated (closed-loop controlled). A monitoring of the actuation device with an electrical drive is possible and relatively simple by way of evaluating the electrical supply of the drive. Electrical drives can be compact and inexpensive and are readily available. In particular, stepper motors can be applied. In particular, a control of the drive can be integrated into the actuation device. Alternatively, the control of the drive can be arranged outside the actuation device.

In particular, the drive can be designed such that a rotor of the drive encompasses a drive shaft. In particular, the drive can be designed such that a stator of the drive encompasses the driven body. In particular, the drive can be designed such that the stator of the drive encompasses the driven body, and the rotor of the drive encompasses the drive shaft.

The actuation device, for example, can also include sensors, which detect a position, a movement or a condition of the actuation device or its components. In particular, the drive, e.g., can include an encoder, or end-switches can be provided for the linear movement component of the intermediate body, for a rotation of a rotor of the drive, for a rotation of the drive shaft and/or for a rotation of the driven body.

The actuation device alternatively or additionally can however also be driven mechanically (for example by way of spring force or a hand-crank). The actuation device alternatively or additionally can also be driven in a pneumatic and/or hydraulic manner. The actuation device alternatively or additionally can also be driven chemically, for example by way of an explosive charge or propellant charge.

A drive of the drive shaft is optionally fastened to the driven body in a rotationally fixed and translatorily fixed manner.

In particular, an electrical drive can be fastened to the driven body in a rotationally fixed and translatorily fixed manner.

What is meant by a drive that is fastened to the driven body in a rotationally and translatorily fixed manner is that a stator of the drive is fastened to the driven body in a rotationally fixed and translatorily fixed manner. Thereby, a rotor of the drive is fastened to the drive shaft, for example.

A drive that is fastened to the driven body in a rotationally and translatorily fixed manner permits a compact design of the actuation device. Such an actuation device can be designed in a self-centering manner, which simplifies the construction of the actuation device.

As a further possible and optional feature, a drive of the drive shaft is essentially spatially surrounded by the intermediate body, in a first position of the actuation device, and the drive of the drive shaft is located essentially outside the intermediate body, in a second position of the actuation device, which is different from the first position.

What is meant by the expression "essentially" is a share of 90%, in particular a share of 75% and in particular a share of 60%.

Expressed differently, the linear movement component of the intermediate body (relative to the reference body) moves the drive at least partly into the intermediate body and out again. Or expressed in other words, the drive at least in regions is located within the intermediate body or outside the intermediate body, depending on the position of the actuation device. The intermediate body, on account of the linear movement component, therefore moves from a position partly enveloping the drive, away from the drive, such that a smaller share of the drive is enveloped by the intermediate body (and vice versa).

The actuation device can be compactly designed in this manner, and can have a relatively large displacement line, since the drive at least partly and at least temporarily can be arranged in the intermediate body.

The drive, however, can alternatively also be arranged outside the intermediate body. Or the drive can, for instance, also be arranged outside the actuation device.

The intermediate body additionally or alternatively, at least in regions can be designed as a hollow cylinder, wherein the hollow cylinder is arranged coaxially to the drive output axis.

The same advantages and alternatives as are described in the immediately preceding paragraphs apply to this optional feature. As a further advantage, an intermediate body, whose shape is designed as a hollow cylinder at least in regions, permits a simple and cost-effective design of the second transmission in the form of helical transmissions, at the inner side and/or outer side of the hollow cylinder. It is particularly electrical drives, which are designed cylindrically at least in regions, which can be enveloped at least regionally and at least temporarily by the intermediate body designed in such a manner, in a space-saving manner and optimised with regard to spatial conditions.

Rotationally symmetrical parts of the actuation device and in particular also of the intermediate body can be manufactured in a simple and inexpensive manner. This can be effected by way of moulding (in particular injection moulding), turning and/or milling. Rotationally symmetrical parts of the actuation device, for example, can also be formed from two mirror-symmetrical half-parts. Such half-parts can again be simply and inexpensively manufactured. The assembly, maintenance and repair of the actuation device are moreover simple, quick and inexpensive if one or more parts of the actuation device include two half-parts that can be put together around already assembled other components, and dismantled again. These advantages of half-parts can also be achieved with other symmetrical divisions, which include equally shaped-out parts, for example third, quarter, fifth, sixth or other divisions.

In particular, the drive shaft can include a thread in the form of a two-start, double thread, which permits the formation of a counter-thread from two equal parts. This in turn permits a simple putting-together and simultaneously also a simple and rapid assembly, maintenance and repair, which are inexpensive on account of this.

As an optional feature, the first transmission and/or the second transmission includes a helical transmission in the form of a plane bearing, with which a helicoidal guide as well as a counter element of the helicoidal guide are formed from plastic, and these are movable on one another and relative to one another by way of sliding friction.

In other words, the first transmission and/or the second transmission each include at least one helical transmission in the form of the plane bearing described above.

In particular, a transmission of the first type can be designed as a plane bearing. In particular, a transmission of the second type can be designed as a plane bearing.

Parts which are moved to one another are in direct contact in the case of plane bearings, thus here the helicoidal guide and the counter-element of the helicoidal guide. These, in direct contact, move relative to one another amid sliding friction.

Plane bearings with surfaces of plastic that rub on one another are simply, inexpensively and quickly manufacturable. The surfaces of the plane bearing that rub on one another, in particular can include different plastics. This applies to regions of the surfaces that rub on one another and/or to one of the rubbing surfaces compared to the other surface that rubs (slides) on this. Specific material pairs, which can be applied in a targeted manner, can have desired sliding friction coefficients, depending on the demands placed upon the actuation device. In particular, the plane bearing can be designed as a shaping-out (shaped-out region) of individual parts of the actuation device which consist of plastic, and as such is accordingly inexpensive and efficient.

Optionally, at least one helicoidal guide of the helical transmission as well as its counter-element each include a flank which, in section planes perpendicular to a rotation axis of the rotational movement of the driven body, run essentially radially with respect to this rotation axis.

Running in an essentially radial manner is to be understood as a maximal deviation of 15 angle degrees from a radially running line. In particular, running in an essentially radial manner is to be understood as a maximal deviation of 10 angle degrees from a radially running line. In particular, running in an essentially radial manner is to be understood as a maximum deviation of 5 angle degrees from a radially running line.

The essentially radially running flanks of the helicoidal guide and of its counter-element permit an efficient and direct force transmission of a rotation about the rotation axis, since these flanks are aligned essentially at right angles to a tangential force of the rotation. The force transmission is effected freely of transverse forces (thus radial forces) or only with very small transverse forces. This type of force transmission is gentle on the material and permits the application of relatively soft materials with a high force transmission, or of extremely high force transmissions in the case of relatively hard materials.

A further optional feature, the helical transmission includes a first and a second helicoidal guide as well as their counter-element, wherein in section planes perpendicular to the rotation axis of the rotational movement of the driven body, the first as well as the second helicoidal guide each include a flank running essentially radially with respect to the rotation axis, and a counter-flank of the same helicoidal guide, which lies opposite this flank, and the counter-flank in the section planes is formed essentially obliquely to a radial alignment, and the radially formed flank of the first helicoidal guide is designed in a manner in which it is arranged leading in the direction of the rotational movement of the driven body, and the radially formed flank of the second helicoidal guide is designed in a manner in which it is arranged trailing in the direction of the same rotational movement of the driven body.

In other words, for a first rotation direction of the helical transmission, the first helicoidal guide includes a flank, which is arranged in a manner leading in the rotation direction and which runs essentially radially in the section planes, whereas the second helicoidal guide includes a flank, which is arranged in a manner trailing in the rotation direction and which runs essentially radially in the section planes. The same applies to a second rotation direction, which is opposite to the first rotation direction, but conversely: here the flank of the second helicoidal guide, which runs essentially radially in the section planes, is arranged in a manner leading in the rotation direction, whereas the flank of the first helicoidal guide, which runs essentially radially in the section planes, is arranged in a manner trailing in the rotation direction.

The first and the second helicoidal guide as well as their counter-element can be designed and positioned such that a spatial distance (play) is formed between the helicoidal guide and the counter-element. The spatial distance can serve the task of only the flank of the first or second helicoidal guide (and its counter-element), which runs essentially radially in the section planes, in each case transmitting the rotational movement in both rotation directions of the helical transmission. Thus either the flank of the first helicoidal guide (and of its counter element), which runs essentially radially in the section planes or the corresponding flank of the section helicoidal guide (and of its counter element), can transmit the rotational movement, depending on the rotation direction of the helical transmission. In this manner, the force transmission can be distributed onto two different helicoidal guides and their counter-elements, depending on the rotation direction.

Expressed differently, with this embodiment, in each case only the first or only the second helicoidal guide with the respective counter element accommodates the force of the rotational movement, depending on the rotation direction.

An advantage of this distribution of the force transmission is the reduced wear and low material loading. This also permits an application of relatively soft materials with a high force transmission, or the application of extremely high force transmissions in the case of relatively hard materials.

The helical transmission, as another optional feature, can include a helicoidal guide as well as its counter element, wherein the helicoidal guide in section planes perpendicular to the rotation axis of the rotational movement of the driven body includes a first and a second flank which run essentially radially with respect to the rotation axis, wherein the first radially formed flank is arranged in a manner leading in the direction of the rotational movement of the driven body, and the second radially formed flank is designed arranged in a manner trailing in the direction of the same rotational movement of the driven body.

If a flank that leads in the rotation direction and well as a flank that trails in the rotation direction are formed in an essentially radially running manner in the section planes, on the same helicoidal guide, then an efficient and direct force transmission of a rotation about the rotation axis and which is already described above and is with the already mentioned advantages is possible, independently of the rotation direction. In particular, a single, helicoidal guide together with a counter-element can thus already form an efficient and robust helical transmission, which permits a simple, rapid and/or inexpensive manufacture on account of a low number of elements.

Two such helicoidal guides (each with a leading and a trailing flank, which are designed running essentially radially in section planes) for example form an efficient and robust helical transmission with a low number of required elements. Such a helical transmission can be manufactured in a simple, rapid and/or inexpensive manner.

For example, the helicoidal guide of the helical transmission as well as its counter element can each include at least one flank and in particular two flanks, in the previously mentioned section planes, wherein these flanks run radially with respect to this rotation axis. The advantages of essentially radially running flanks also apply to these radially running flanks.

The surfaces of the plane bearing that rub on one another, in particular, can be of a different material. This also applies to regions of the surfaces rubbing on one another and/or to one of the rubbing surfaces in comparison to the other surface that rubs on this.

Alternatively, parts of the plane bearing or individual parts including parts of the pane bearing can also be manufactured of ceramic. Or the plane bearings include surfaces of plastic that rub on one another and that are merely designed as coatings of plastic on another material. A coating of surfaces rubbing on one another and from plastic is also conceivable for forming the plane bearing.

Optionally, the first transmission and/or the second transmission can include a transmission, which is designed as a roller bearing and which serves for converting the linear movement component into the rotational movement.

Parts that are moved relative to one another are supported on one another via roller bodies in the case of a roller bearing. A mutual moving of the parts can be effected by way of rolling friction between the moved parts and the roller bodies. A mutual moving of the parts can also be effected at least partly by way of sliding friction between the moved parts and the roller bodies. In particular, a mutual moving of the parts can be effected by a mixture of rolling friction and sliding friction, between the moved parts and the roller bodies. These roller bodies for example can be balls or rollers.

In particular, a transmission of the first type can be designed as a roller bearing. In particular, a transmission of the second type can be designed as a roller bearing.

In particular, the second transmission can include a helical transmission that is designed as a roller bearing. This means that the helicoidal guide and the counter-element of the helicoidal guide form a roller bearing. Expressed differently, this corresponds to a helical transmission that is guided by roller bearings. Thereby, the rolling friction replaces the sliding friction of the plane bearing.

As a further optional feature, the drive shaft on the one hand includes a drive (which is thus encompassed by the actuation device), and the drive shaft on the other hand additionally to this includes an interface, at which the drive shaft can be driven by auxiliary means arranged outside the actuation device.

Further drives can be coupled onto the drive shaft by way of this interface. These further drives can be permanently connected to the drive shaft, or also only temporarily connected to the drive shaft, which is to say when required. The further drives, for example, can be a hand crank, a fail-safe mechanisms or an amplification drive, wherein the amplification drive amplifies the drive of the actuation device.

A fail-safe mechanism is a mechanism that ensures the safety from failure. This, for example, can be realised by a replacement component, which in the case of a failure assumes the function of the failed component. In this case it is therefore a second drive that can drive the actuation device in the case of a failure of the drive of the actuation device.

As a different example, a component that operates in parallel and assumes the additional loading in the event of a failure of the first component can be applied as a fail-safe mechanism. In the present case, for instance, this is a second drive which, together with the drive of the actuation device, drives the drive shaft, but in the case of a failure of the drive of the actuation device is capable of driving the drive shaft by itself.

The fail-safe mechanism in particular can include an energy store that keeps a sufficient amount of stored energy readily available, in order to drive the actuation drive at least for one actuation movement. The fail-safe mechanism can store energy in the form of mechanical, electrical and/or chemical energy. The fail-safe mechanism, for example, can include springs, pressure containers, batteries, capacitors and/or ignition charges as energy stores.

The driven body as an optional feature has a maximal rotational degree of freedom of 400 degrees, in particular of maximal 200 degrees and in particular of maximal 100 degrees, in the direction of its rotational movement.

Alternatively or additionally, a ratio of transmission between the rotational movement of the drive shaft and the rotational movement of the driven body can lie in a range of 20:1 to 800:1, in particular in a range of 40:1 to 200:1 and in particular in a range of 60:1 to 120:1.

As a further optional feature, the second transmission is designed in the form of a helical transmission, which has a thread pitch in the range of 10 degrees to 80 degrees, in particular of 30 degrees to 60 degrees and in particular of 40 degrees to 50 degrees.

Additionally or alternatively to this, a maximal torque of the driven body can lie in a range of 0.1 to 100 Nm, in particular in a range of 0.1 to 50 Nm and in particular in a range of 0.1 to 30 Nm, on executing an actuation movement (thus with the rotational movement of the driven body relative to the reference body). A maximal torque in the range of 1 to 10 Nm is also conceivable. In particular, the maximal torque however can also lie in a range of 0.1 to 200 Nm.

A further aspect of the invention relates to a method for operating an actuation device.

The actuation device can optionally be operated such that the driven body executes a small movement counter to the direction of the actuation movement, at the end of the actuation movement. This prevents a jamming, clamping and/or seizure of the actuation device in an end position and simplifies a further actuation movement. This small movement can relieve the actuation device from a force which would otherwise remain applied to the actuation device until the next actuation movement. This small movement can avoid a yielding or deformation of plane bearings in the case of a longer lasting loading, and this can be of a particular advantage in the case of plane bearings of plastic.

The actuation device can optionally be operated, for example, in manner such that the driven body executes small movements in the single-digit percent range of the actuation movement (or below this), in time intervals between actuation movements.

In particular, several small movements can be executed in a temporally consecutive manner in directions opposite to one another, which corresponds to a type of juddering movement. One or more such small movements and/or juddering movements can prevent a seizure of the actuation device and/or elements that are adjusted by this or at least render such a seizure more difficult or slow it down. A seizure and/or an encrustation of a valve which is set by the actuation drive for example can be prevented or rendered less probable or slowed down.

If the first and/or the second transmission have play, then one or more of these small movements can be utilised for a release or a breaking-away of a seized actuation device or of a seized valve, wherein these one or more small movements at least partly run through the play. Expressed differently, the play can be utilised as a run up or as a space for increasing momentum. Juddering movements, which at least partly include the play, can advantageously be used for releasing or for the breaking-away of seized actuation devices and/or valves. What is meant by play is the room to move, thus a movement freedom of parts of the transmission that mesh.

The actuation device, which is described above is robust with respect to such small movements, on account of its special design, and is therefore more suited for such small movements than a gearwheel transmission for example.

A further aspect of the invention relates to a device including a fail-safe mechanism and an actuation device, preferably an actuation device with an interface as already described above, wherein the fail-safe mechanism is designed in a manner separable from the actuation device and includes an energy store that keeps available an adequate amount of stored energy, in order to drive the actuation device at least for one actuation movement.

BRIEF DESCRIPTION OF THE DRAWINGS

The subject-matter of the invention is hereinafter described in more detail by way of a preferred embodiment example which is represented in the accompanying drawings. There are shown in:

FIG. 7 a view of constituents of the actuation device of FIG. 1, in a perspective representation;

FIG. 8 a perspective view of the intermediate body from below;

FIG. 9 a perspective view of a drive shaft from above;

DETAILED DESCRIPTION OF THE INVENTION

Figure 1:
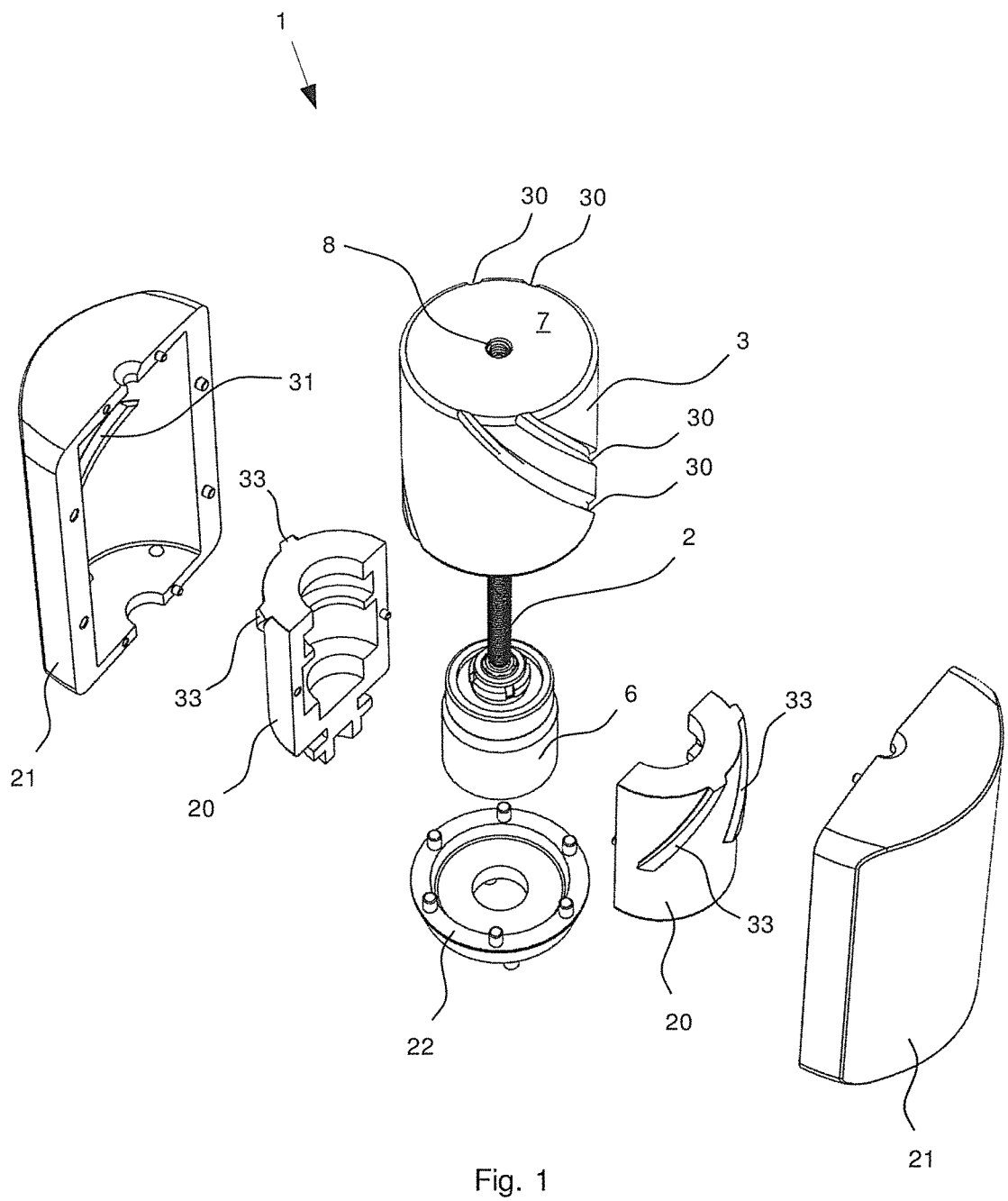
FIG. 1 an exploded representation of an actuation device, in a perspective view from above.

Basically in the figures, the same parts are provided with the same reference numerals.

FIG. 1 shows an exploded representation of an actuation device 1 in a perspective view from above. The actuation device 1 includes a drive shaft 2, an intermediate body 3 and a reference body 4, which is composed of two equal housing halves 21 as well as a base plate 22. The actuation device 1 moreover includes a driven body 5, which is composed of two equal driven body halves 20, and a drive 6. The drive 6 in this case is an electrical stepper motor.

The intermediate body 3, the reference body 4 and the driven body 5 are manufactured from plastic. The driven body halves 20 are designed equally, and the housing halves 21 are likewise designed equally, which permits a simple and inexpensive manufacture. The assembly, maintenance and repair of the actuation device 1 is moreover simple, rapid and inexpensive, due to the fact that the driven body 5 and the reference body 4 can be put together around already assembled other components, and dismantled again.

The mentioned plastic parts include functional shaping-outs (shaped-out regions), which can be formed in a simple, rapid and inexpensive manner on manufacture. For example, the intermediate body 3, the reference body 4 and the driven body 5 include functional parts of transmissions (i.e. a helicoidal guide or a counter-element of the helicoidal guide), specifically functional parts of the first and/or the second transmission (of the first and/or second type). The actuation device 1 includes only few parts (or halves of parts), which moreover can be manufactured predominantly in a simple and inexpensive manner from plastic.

Individual functional parts of the second transmission 12 including a part-transmission of the first type 13 and a part-transmission of the second type 14 are clearly evident already in FIG. 1. The intermediate body 3, which is designed as a hollow cylinder with a cover 7, for example on an outer side of the hollow cylinder includes four helicoidal guides 30 of the part-transmission of the first type 13. The helicoidal guides 30 of the part-transmission of the first type 13 are designed as grooves with a trapezoidal cross section, wherein with regard to the cross section, a base of the grooves is smaller than an opening of the grooves.

The helicoidal guides 30 of the part-transmission of the first type 14 have a pitch of 45 degrees. The counter-elements 31 of the helicoidal guide 30 of the part-transmission of the first type 13 are shaped out on an inner side of the housing halves 21 and have a shape that is complementary to the helicoidal guides 30 of the part-transmission of the first type 13. The counter-elements 31 of the helicoidal guide 30 of the part-transmission of the first type 13 also have a pitch of 45 degrees. The helicoidal guides 30 of the part-transmission of the first type 13 and well as their counter-elements 31 extend so far over the outer side of the hollow cylinder of the intermediate body 3 and over the inner side of the housing halves 21 of the reference body 4 respectively, that the part-transmission of the first type 13 is capable of executing a helical movement of an eighth of a turn (45 degrees).

Four counter-elements 33 of a helicoidal guide 32 of the part-transmission of the second type 14 and are shaped out on an outer side of the driven body halves 20 are partly evident in FIG. 1. The counter-elements 33 of the helicoidal guides 32 of the part-transmission of the second type 14 have a pitch of 45 degrees. The helicoidal guides 32 of the part-transmission of the second type 14 as well as their counter-elements 33 extend so far over the inner side of the hollow cylinder of the intermediate body 3 and over the outer side of the driven body halves 20 respectively, that the part-transmission of the first type 13 is capable of executing a helical movement of an eighth of turn (45 degrees).

The part-transmission of the first type 13 as well as the part-transmission of the second type 14 is thus designed as a helical transmission. The first transmission 11 is likewise designed as a helical transmission. The drive shaft 2 on a part of its outer side includes a thread, which interacting with a counter thread 8 encompassed by the cover 7 of the intermediate body 3 forms the first transmission 11. The intermediate body 3 is hence moved with a linear movement component along the middle axis of the spindle 2 by way of a rotational movement of the spindle 2, on account of its coupling to the spindle 2 by way of the first transmission 11.

Figure 2:
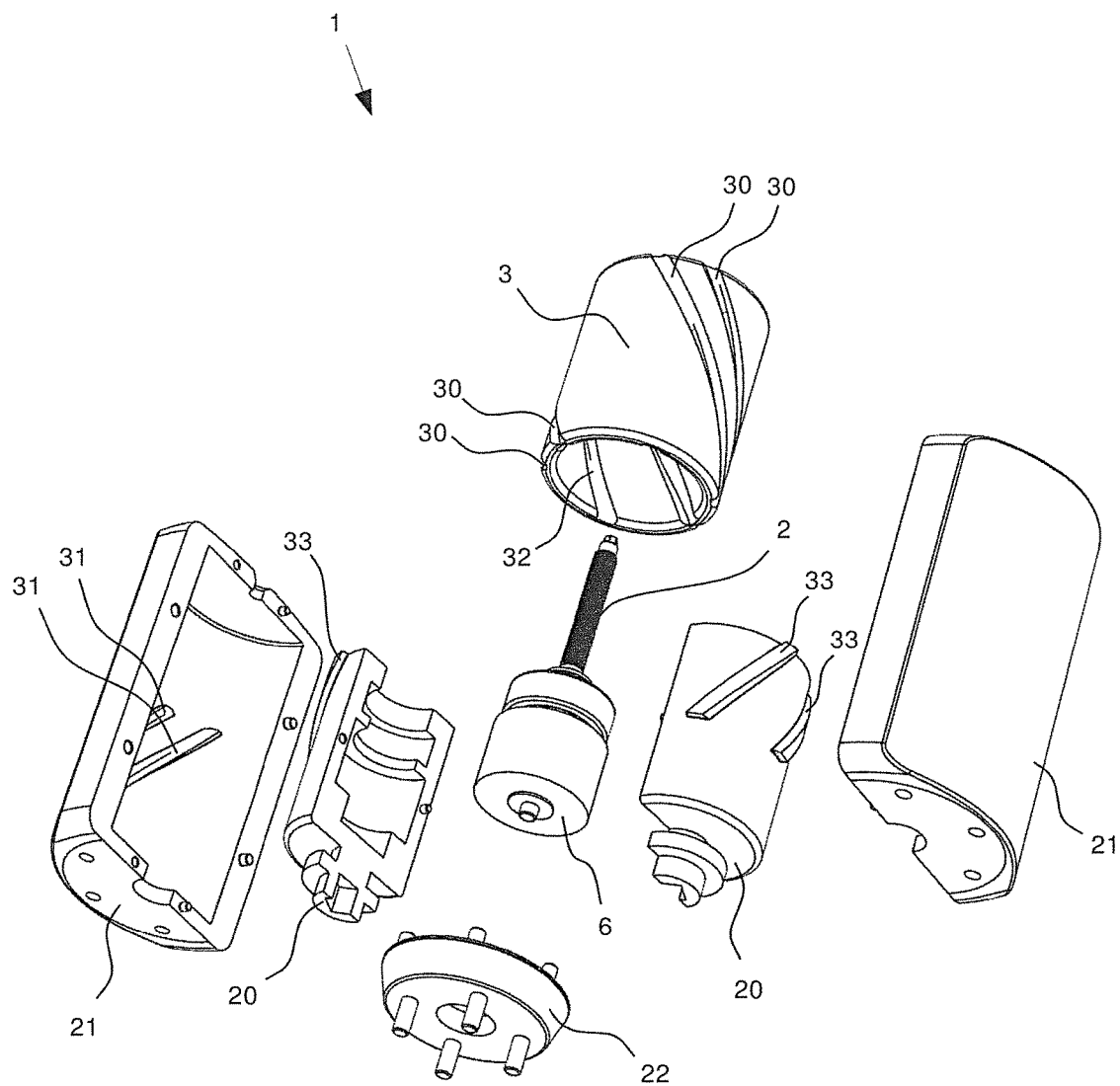
FIG. 2 the exploded representation of FIG. 1, in a perspective view from below.

FIG. 2 shows the exploded representation from FIG. 1, in a perspective view from below. Here, the helicoidal guides 32 of the part-transmission of the second type 14 and which are formed on the inner side of the hollow cylinder of the intermediate body 3 can be additionally recognised.

Figure 3:
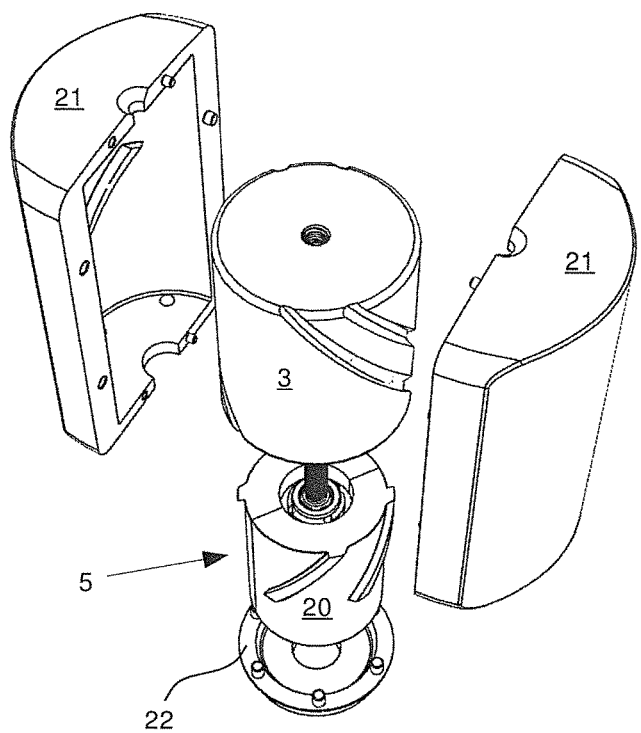
FIG. 3 a partially exploded representation of the actuation device of FIG. 1, in a perspective view from above, wherein the driven body is not shown in the exploded representation.
Figure 4:
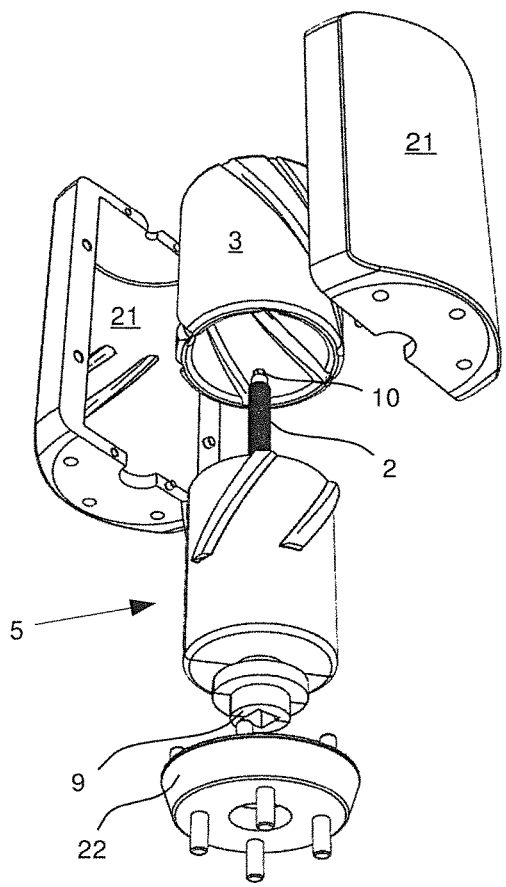
FIG. 4 the exploded representation of FIG. 3, in a perspective view from below.

A partly exploded representation of the actuation device 1 of FIG. 1 is represented in a perspective view from above in FIG. 3. Thereby, the driven body 5 is not represented in the exploded representation. FIG. 4 shows the same in a perspective view from below. It is clearly evident from FIGS. 3 and 4, as to how the two driven body halves 20 encompass and fasten the drive 6 in the assembled condition. The shaping-outs (shaped out regions), which are suitable for this, are formed on an inner side of the driven body halves 20, and can be easily recognised for example in FIGS. 1 and 2.

The drive shaft 2, which projects out of the driven body 5, is fastened on the drive 6, more precisely on a rotor of the drive 6. A drive output coupling 9 with a square opening projects out of the driven body 5 in the opposite direction, by which means the driven body 5 can be connected to an element to be actuated, for example a valve. The drive output coupling 9 and the drive shaft 2 are arranged coaxially and fastened on the reference body 4 in a self-centering manner. The drive output coupling 9 in the assembled condition of the actuation device 1 extends through a central opening of the round base plate 22. The drive shaft 2 at an end of the reference body 4, which lies opposite to the middle opening of the base plate 22, extends through an opening of the reference body 4 and is rotatably mounted there, for example by way of a ball bearing. An interface 10 in the form of a hexagonal end of the drive shaft 2 and upon which the drive shaft 2 can be engaged and driven from outside the actuation device 1, is also formed at this end of the drive shaft 2.

Figure 5:
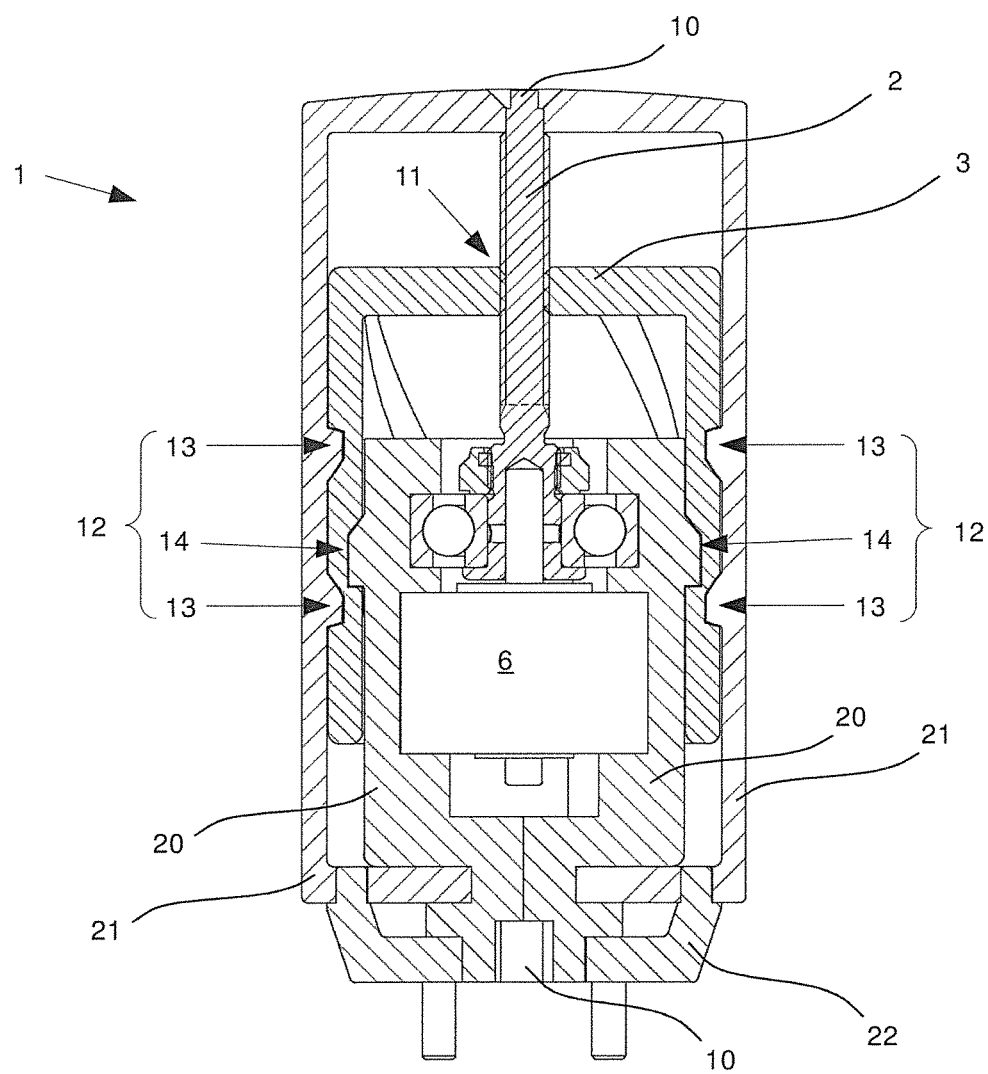
FIG. 5 a longitudinal section through the actuation device of FIG. 1.
Figure 6:
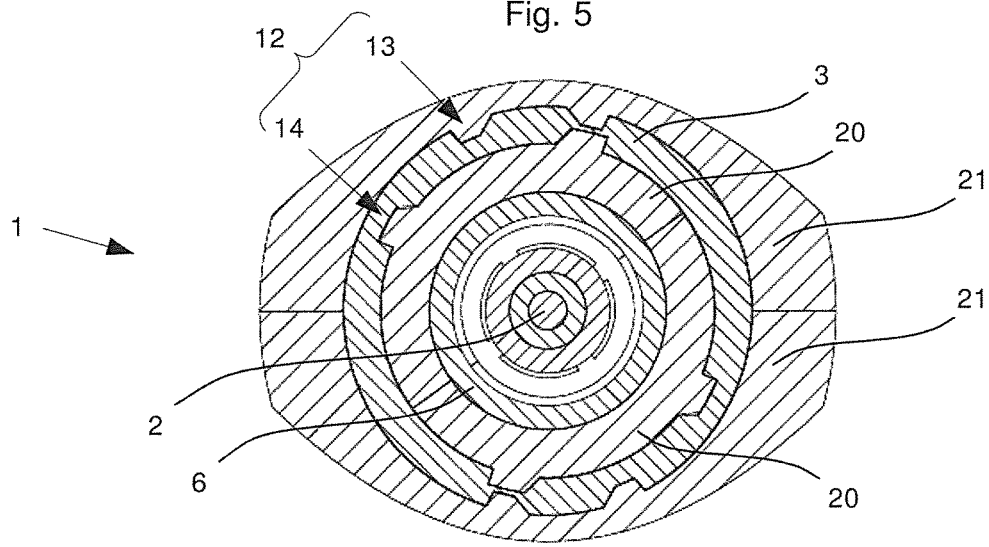
FIG. 6 a cross section through the actuation device of FIG. 1.

FIG. 5 shows a longitudinal section through the actuation device 1 of FIG. 1, and FIG. 6 shows a cross section through the actuation device 1 of FIG. 1. The actuation device 1 is thereby represented in the assembled condition ready for operation. The first transmission 11 and the second transmission 12 with its two part-transmissions, specifically the part-transmission of the first type 13 and the part-transmission of the second type 14 are well recognisable in the FIGS. 5 and 6.

FIG. 7 shows a view of constituents of the actuation device 1 from FIG. 1, in a perspective representation, specifically a view of a drive 6, which is embedded in a driven body half 20 in the put-together position. The drive shaft 2 is thereby fastened to the drive 6.

FIG. 8 shows a perspective view of an intermediate body from below, wherein the helicoidal guides 30 of the part-transmission of the first type 13 and the helicoidal guides 32 of the part-transmission of the second type 14 are well visible.

Figure 10:
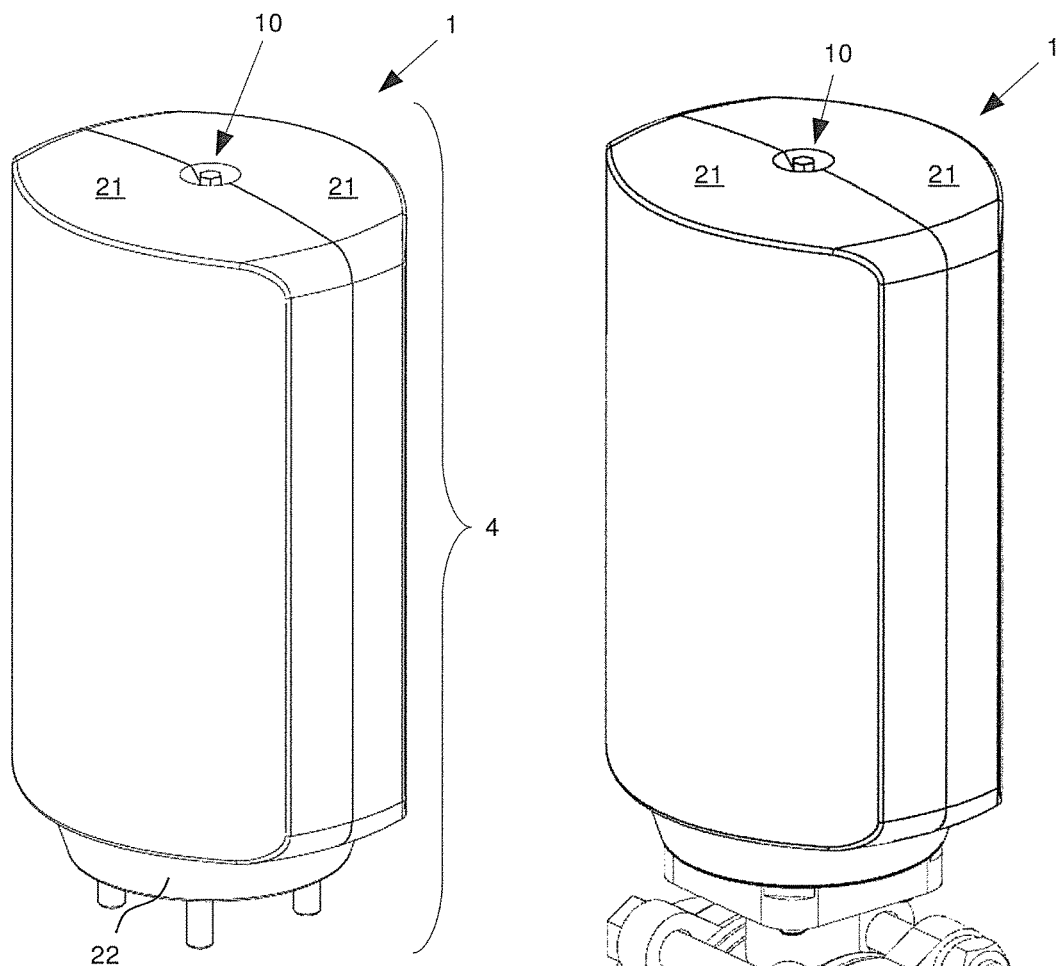
FIG. 10 a perspective view of the actuation device of FIG. 1, from above.
Figure 11:
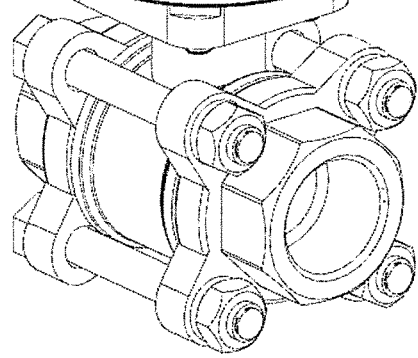
FIG. 11 the same view as in FIG. 10, wherein the actuation drive is assembled on a valve.

FIG. 9 shows a perspective view of the drive shaft 2 from above. FIG. 10 in turn shows a perspective view of the actuation device 1 from FIG. 1, which is already put together and assembled in an operationally ready manner. FIG. 11 shows the same view as in FIG. 10, wherein the actuation device 1 is assembled on a valve 40.

The actuation device 1 is operated in a manner such that when required, it is moved from a first actuation position into a second actuation position and back. In the present case, the first actuation position differs from the second actuation position in that the drive output coupling 9 and thus also the driven body 5 are rotationally pivoted, which is to say twisted to the reference body 4, by a quarter rotation, i.e. by 90 degrees. Thus, a reference point of the drive output coupling 9 is located at a position with 0 degrees of rotational deflection relative to the reference body 4, in the first actuation position. In contrast, the reference point of the drive output coupling 9 is located at a position with a 90 degree rotational deflection relative to the reference body 4, in the second actuation position.

The drive 6 in the second actuation position is likewise rotationally pivoted, which is to say twisted to the reference body 4 by a quarter rotation, i.e. by 90 degrees, due to the fact that the drive 6 is fastened to the driven body 5. Stated more precisely, the stator of the drive 6 is fastened to the driven body 5, and hence the stator of the drive 6 is rotationally pivoted to the reference body 4 by a quarter of a rotation, i.e. by 90 degrees.

The second transmission 12 includes two part-transmissions, which in the second actuation position are each rotationally twisted by an eighth of a rotation, i.e. by 45 degrees, this being the case on the one hand relative to the reference body 4 (part-transmission of the first type 13) and on the other hand relative to the driven body 5 (part-transmission of the second type 14). Both eighth rotations are effected in the same rotational direction, by which means the two eighth rotations add up to the quarter rotation which the drive output coupling 9, the driven body 5 and the stator of the drive 6 have in the second actuation position. The intermediate body 3 is therefore twisted or pivoted only half as far as the driven body 5 and the stator of the drive 6.

The drive 6 therefore drives the drive shaft 2 given an actuation movement of the actuation device 1, and this drive shaft rotates relative to the reference body 4 on account of this. The drive shaft 2 is fastened to the reference body 4 in a rotatable, but translatorily fixed manner. The rotational movement of the drive shaft 2, by way of the first transmission 11, on the one hand is converted into a linear movement component (of the intermediate body 3 relative to the reference body 4) and on the other hand into a rotational movement component (of the intermediate body 3 relative to the reference body 4). The intermediate body 3 thus undergoes a combined rotation-translation movement relative to the reference body 4. Thereby, the second transmission 12, via the part-transmission of the first type 13 and the part-transmission of the second type 14, converts the combined rotation-translation movement of the reference body into a rotational movement of the driven body 5. The linear movement component of the intermediate body 3 is converted into the rotational movement of the driven body 5 by way of this. The driven body 5 is also fastened to the reference body 4 in a rotatable, but translatorily fixed manner. The displacement line, along which the intermediate body 3 is moved by the linear movement component, runs parallel to the middle axis of the drive shaft 2.

The actuation device 1, which is represented in the figures, has a transmission between the drive shaft 1 and the driven body with a transmission ratio of 80:1.

In particular, the drive shaft 2 can include a thread in the form of a two-start double thread, and the counter-thread is composed of two equal parts.

A typical duration for an actuation movement of the described actuation device 1 can lie in the range of 2-3 seconds. However, more rapid actuation movements are also possible. Slower actuation movements are also possible, in particular actuation movements lasting up to 10 seconds and in particular up to 30 seconds long. An actuation movement thereby corresponds to a movement from the first (end) position of the actuation device 1 into the second (end) position of the actuation device 1.

A fail-safe mechanism can be connected and fastened to the interface 10, which is well recognised in FIGS. 10 and 11. In particular, the fail-safe mechanism can be designed in a modular manner and be designed in a manner separable from the actuation device 1.

Figure 12:
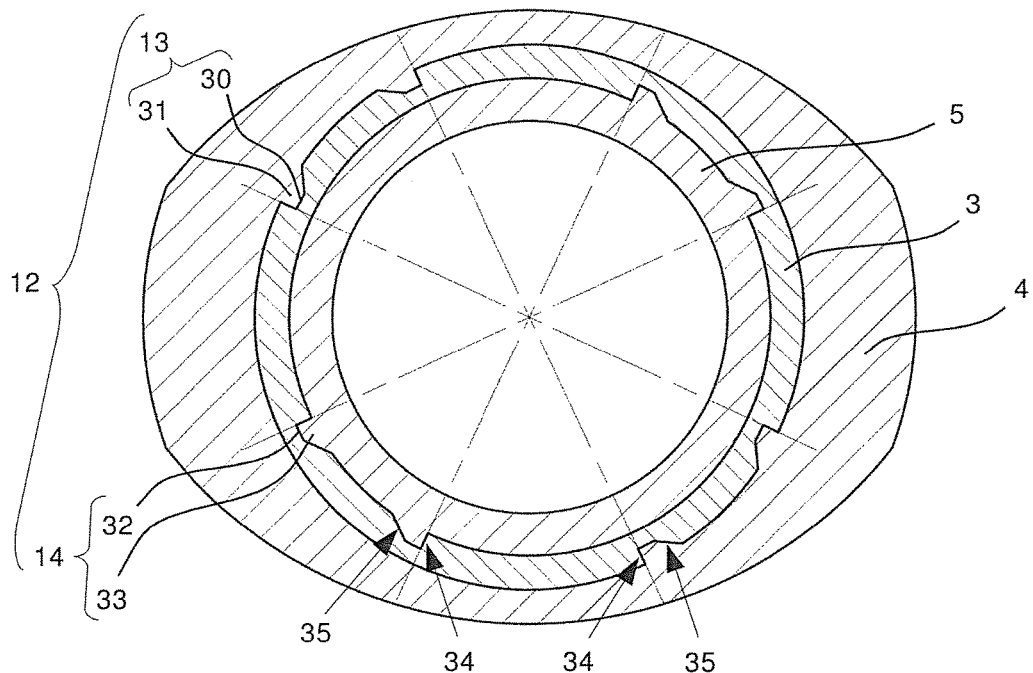
FIG. 12 a cross section analogous to FIG. 6, through a part of a second embodiment of an actuation device.

Analogously to a part of FIG. 6, FIG. 12 shows a cross section through a reference body 4, an intermediate body 3 and a driven body 5 of a second embodiment of an actuation device. The second transmission 12 includes a part-transmission of the first type 13 as well as a part-transmission of the second type 14. The part-transmission of the first type 13 includes a helicoidal guide 30 and its counter-element 31. The part-transmission of the second type 14 includes a helicoidal guide 32 and its counter element 33. In FIG. 12, the part-transmission of the first type 13 as well as the part-transmission of the second type 14, in each case on a helicoidal guide 30, 32 and on its counter element 31, 33, in each case include a radially running flank 34 and well as a flank 35 running obliquely to a radial alignment.

The second embodiment of the actuation device in FIG. 12, as with the first embodiment in FIG. 6, in each case in the part-transmission of the first type 13 includes four helicoidal guides 30 and four corresponding counter-elements 31. Likewise, the first and the second embodiment of the actuation device, in each case in the part-transmission of the second type 14 include four helicoidal guides 32 and four corresponding counter-elements 33.

The radially running flanks 34 of respective, adjacent helicoidal guides 30, 32, considered along the periphery of the intermediate body 3 are arranged in an opposite manner to one another in FIG. 12, and this being the case with the part-transmission of the first type 13 as well as with the part-transmission of the second type 14. Expressed differently, with a rotation in a rotation direction, with regard to two of the four helicoidal guides 30, 32, which are not adjacent, their radially running flanks 34 would each be arranged in a manner leading in the rotation direction, and with regard to the other two helicoidal guides 30, 32 arranged therebetween, their radially running flanks 34 would each be arranged in a manner trailing in the rotation direction.

With the first embodiment of the actuation device, as is represented in FIG. 6, only the part-transmission of the second type 14 has a radially running flank 34, which with regard to adjacent helicoidal guides 34 is arranged in each case in an opposite manner considered along the periphery of the intermediate body 3. The part-transmission of the first type 13, with the first embodiment in contrast includes an essentially radially running flank 34, which with regard to adjacent helicoidal guides 34 is arranged in each case in an opposite manner considered along the periphery of the intermediate body 3. The essentially radially running flank 34 of the part-transmission of the first type 13 has an angle of 15 angle degrees to a radially running line.

Figure 13:
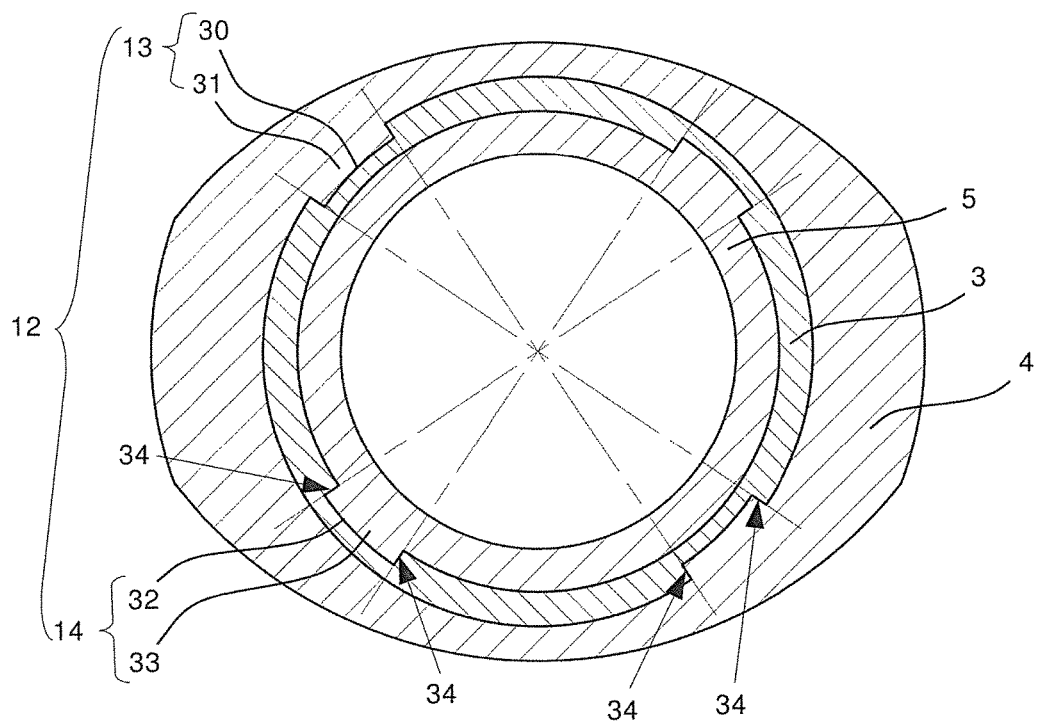
FIG. 13 a cross section as in FIG. 12, through a part of a third embodiment of an actuation device.

FIG. 13, as FIG. 12, shows a cross section through a reference body 4, an intermediate body 3 and a driven body 5, but a third embodiment of the actuation device is represented in FIG. 13. In this third embodiment, the part-transmission of the first type 13 as well as the part-transmission of the second type 14 in each case only includes two helicoidal guides 30, 32 and their counter elements 31, 33. Each of these in each case two helicoidal guides 30, 32 as well as their counter-elements 31, 33 each include two radially running flanks 34. The two radially running flanks 34 of each helicoidal guide 30, 32 as well as their counter-elements 31, 33 in each case are arranged in an opposite manner considered along the periphery of the intermediate body 3. The third embodiment thus in the second transmission 12 has no flanks running obliquely to a radial alignment.

The invention claimed is:

1. An actuation device for producing a rotational actuation movement from a rotational drive movement for rotational adjustment of a valve, comprising a drive shaft, an intermediate body, a reference body and a driven body, wherein the drive shaft, intermediate body, reference body, and driven body of the actuation device are movable relative to one another, said actuation device also comprising a first transmission and a second transmission, which is different from the first transmission, wherein the first transmission converts a rotational movement of the drive shaft relative to the reference body into a linear movement component of the intermediate body relative to the reference body, the actuation device has a displacement line, along which the intermediate body moves by way of the linear movement component of the intermediate body relative to the reference body and the second transmission comprises a transmission of a second type, wherein the transmission of the second type converts the linear movement component of the intermediate body relative to the reference body into a rotational movement of the driven body relative to the reference body and converts a linear movement component of the intermediate body relative to the driven body into a rotational movement of the intermediate body relative to the driven body.

2. The actuation device according to claim 1, wherein the second transmission comprises a transmission of a first type, wherein the transmission of the first type converts the linear movement component of the intermediate body relative to the reference body into a rotational movement of the intermediate body relative to the reference body.

3. The actuation device according to claim 1, wherein a drive axis is arranged coaxially to the drive output axis, wherein the drive shaft rotates about the drive axis given the rotational movement, and the driven body rotates about the drive output axis given the rotational movement.

4. The actuation device according to claim 1, wherein the displacement line is arranged parallel to a drive output axis, and wherein the driven body rotates about the drive output axis given the rotational movement.

5. The actuation device according to claim 1, wherein at least one of the first and second transmissions comprise a helical transmission that is arranged for the conversion of the rotational movements or of the linear movement component.

6. The actuation device according to claim 1, wherein the drive shaft is mounted on the reference body in a translatorily fixed, but rotatable manner, and the driven body is also mounted on the reference body in a translatorily fixed, but rotatable manner.

7. The actuation device according to claim 1, wherein the actuation device comprises an electrical drive that is arranged for driving the drive shaft.

8. An actuation device for producing a rotational actuation movement from a rotational drive movement for rotational adjustment of a valve, comprising a drive shaft, an intermediate body, a reference body and a driven body, wherein the drive shaft, intermediate body, reference body, and driven body of the actuation device are movable relative to one another, said actuation device also comprising a first transmission and a second transmission, which is different from the first transmission, wherein the first transmission converts a rotational movement of the drive shaft relative to the reference body into a linear movement component of the intermediate body relative to the reference body, the actuation device has a displacement line, along which the intermediate body moves by way of the linear movement component of the intermediate body relative to the reference body and the second transmission converts the linear movement component of the intermediate body relative to the reference body into a rotational movement of the driven body relative to the reference body, wherein a drive of the drive shaft is fastened to the driven body in a rotationally fixed and translatorily fixed manner.

9. An actuation device for producing a rotational actuation movement from a rotational drive movement for rotational adjustment of a valve, comprising a drive shaft, an intermediate body, a reference body and a driven body, wherein the drive shaft, intermediate body, reference body, and driven body of the actuation device are movable relative to one another, said actuation device also comprising a first transmission and a second transmission, which is different from the first transmission, wherein the first transmission converts a rotational movement of the drive shaft relative to the reference body into a linear movement component of the intermediate body relative to the reference body, the actuation device has a displacement line, along which the intermediate body moves by way of the linear movement component of the intermediate body relative to the reference body and the second transmission converts the linear movement component of the intermediate body relative to the reference body into a rotational movement of the driven body relative to the reference body, wherein in a first position of the actuation device, a drive of the drive shaft is essentially spatially surrounded by the intermediate body, and in a second position of the actuation device, which is different from the first position, the drive of the drive shaft is located essentially outside the intermediate body.

10. The actuation device according to claim 1, wherein the intermediate body at least in regions is designed as a hollow cylinder that is arranged coaxially to a drive output axis, wherein the driven body rotates about the drive output axis given the rotational movement.

11. The actuation device according to claim 1, wherein at least one of the first and second transmissions comprises a helical transmission in the form of a plane bearing, comprising a helicoidal guide and a counter element of the helicoidal guide that are movable on one another and relative to one another by way of sliding friction.

12. The actuation device according to claim 1, wherein the drive shaft comprises a drive and an interface, at which interface the drive shaft can be driven by auxiliary means arranged outside the actuation device.

13. The actuation device according to claim 1, wherein the driven body has a maximal rotational degree of freedom of 400 degrees, in the direction of its rotational movement.

14. The actuation device according to claim 1, wherein a ratio of transmission between the rotational movement of the drive shaft and the rotational movement of the driven body lies in a range of 20:1 to 800:1.

15. A device comprising a fail-safe mechanism and an actuation device according to claim 12, wherein the fail-safe mechanism is designed in a manner separable from the actuation device and comprises an energy store that keeps available an adequate amount of stored energy, in order to drive the actuation device at least for one actuation movement.

16. The actuation device according to claim 11, wherein at least one helicoidal guide of the helical transmission as well as its counter-element each comprise a flank, and the respective flank in section planes perpendicular to a rotation axis of the rotational movement of the driven body run essentially radially with respect to this rotation axis.

17. The actuation device according to claim 16, wherein the helical transmission comprises a first and a second helicoidal guide as well as their counter-elements, wherein
in section planes perpendicular to the rotation axis of the rotational movement of the driven body, the first as well as the second helicoidal guide each comprise a flank running essentially radially with respect to the rotation axis, and a counter-flank of the same helicoidal guide which lies opposite this flank, and the counter-flank in the section planes is formed essentially obliquely to a radial alignment, and
the radially formed flank of the first helicoidal guide is designed in a manner in which it is arranged leading in the direction of the rotational movement of the driven body, and the radially formed flank of the second helicoidal guide is designed in a manner in which it is arranged trailing in the direction of the same rotational movement of the driven body.

18. The actuation device according to claim 16, wherein the helical transmission comprises a helicoidal guide as well as its counter element, and the helicoidal guide in section planes perpendicular to the rotation axis of the rotational movement of the driven body comprises a first and a second flank which run essentially radially with respect to the rotation axis, wherein the first radially formed flank is arranged in a manner leading in the direction of the rotational movement of the driven body, and the second radially formed flank is designed arranged in a manner trailing in the direction of the same rotational movement of the driven body.

19. The actuation device according to claim 11, wherein surfaces of the plane bearing that rub on one another are formed from different materials.

20. The actuation device according to claim 1, wherein the second transmission surrounds the first transmission, in a projection in the direction of a rotation axis of the rotational movement of the driven body.

21. The actuation device according to claim 11, wherein helicoidal guide and a counter element of the helicoidal guide are formed from plastic.

* * * * *